US006195838B1

(12) United States Patent
Mains et al.

(10) Patent No.: US 6,195,838 B1
(45) Date of Patent: Mar. 6, 2001

(54) ROLLER ASSEMBLY WITH SPRING BIASED AXIAL CASTER MEMBER

(76) Inventors: David R. Mains, 603 Pine Cone Cove, Niceville, FL (US) 32578; Everett B. James, Jr., 2206 W. 11th St., Panama City, FL (US) 32401

( * ) Notice: Subject to any disclaimer, the term of this patent is extended or adjusted under 35 U.S.C. 154(b) by 0 days.

(21) Appl. No.: 09/339,488

(22) Filed: Jun. 24, 1999

(51) Int. Cl.$^7$ .................................................. B60B 33/08
(52) U.S. Cl. ........................ 16/25; 16/26; 16/44; 16/18 R
(58) Field of Search ................................ 16/24, 25, 26, 16/27, 47, 44, 18 R; 180/20

(56) References Cited

U.S. PATENT DOCUMENTS

| | | | |
|---|---|---|---|
| 2,034,509 | * 3/1936 | Haven | 16/26 |
| 2,255,454 | * 9/1941 | Rust | 16/26 |
| 2,972,162 | * 2/1961 | Townsend | 16/26 |
| 3,401,421 | * 9/1968 | Aninger | 16/25 |
| 3,462,792 | * 8/1969 | Greco | 16/88 |
| 5,906,247 | * 5/1999 | Inoue | 16/26 |

* cited by examiner

*Primary Examiner*—Chuck Y. Mah
(74) *Attorney, Agent, or Firm*—William B. Noll

(57) ABSTRACT

A dual roller assembly adapted to simultaneously rotate along perpendicular surfaces. The roller assembly comprises a pair of telescopically engaging shaft members sized to rotate and move axially of one another. A first of the shaft member, mounts first and second interfitting cylindrical members receiving a rotary caster ball, where the rotary caster ball is supported for rotative movement within the roller unit formed by the interfitting cylindrical members, by a first ball bearing ring. The second shaft member mounts a cylindrical cap member for receiving a second ball bearing ring in rotary contact with the second cylindrical member, and finally, the second shaft member further mounts a fixed annular ring spaced from the cylindrical cap member, and an encircling compression spring on the second shaft member extending between the cylindrical cap member and the annular ring, to provide shock obsorbing features thereto.

7 Claims, 4 Drawing Sheets

ROLLER ASSEMBLY WITH SPRING BIASED AXIAL CASTER MEMBER

RELATED APPLICATION

This application is a companion to and filed concurrently with U.S. Ser. No. 09/339,655, entitled "Adjustable Shelf For Vehicular Camper", by one of the inventors hereof.

FIELD OF THE INVENTION

This invention is directed to the field of roller assemblies that may be suitable for mobile furniture, equipment, and the like, where protection or bearing against a surface perpendicular to the roller thereof may be required.

BACKGROUND OF THE INVENTION

The invention hereof relates to a dual purpose roller assembly that includes a spring biased axial caster member, where a prime use of such assembly lies in its incorporation into the sliding shelf disclosed in co-pending application, Ser. No. (Docket No. 255RJD), the contents of which are incorporated in its entirety in this invention. However, because of the unique design of the roller assembly hereof, there are other and diverse applications where the omni directional roller assembly of this invention may be used. For example, it may be incorporated into mobile furniture or equipment where protection against a vertical object or wall may be required. The best that the prior art seems to offer is a rotary caster, with or without a static bumper guard.

Exemplary prior art may be found in the following U.S. Patents:

a.) U.S. Pat. No. 5,899,517, to Murawa et al., discloses a stress-homogenized track wheel with a wheel disk which connects the wheel hub and wheel rim and decreases in thickness from the hub towards the rim. The disk's outer surfaces merges via three-center curves as radial generatrices targentially with the adjacent outer surfaces of the hub and rim. In order to suppress stress peaks and reduce the stress across the radial width of the wheel disk, the two outer surfaces of the wheel disk are defined in the radial central area geometrically by radial straight generatricies which intersect in the area between the three center curves on the wheel.

b.) U.S. Pat. No. 5,594,974, to Wattron et al., relates to a releasable caster for use with a movable structure having a bottom wall wherein the caster has a swivel connected yoke and stem with the yoke supporting a plastic wheel. The stem includes a manually operable spring biased rod that has an indentation between its ends and co-acts with a ball detent. A shell with a flange at its outer end is adapted to be received in an opening in the wall. The shell has an abutment, preferably in the form of a groove with the upper edge forming an abutment which cooperatively locks the ball detent or releases the ball when the rod is moved longitudinally or rotationally.

c.) U.S. Pat. No. 5,518,322, to Hickes, teaches a shopping cart wheel bearing which has a smooth inner race and an outer bearing holding with many semi-cylindrical openings. Each of these openings support a roller bearing or a pair of ball bearings which extend inwardly from the outer bearing to contact the inner race. As the wheel turns, each roller or ball bearing turns in the semi-cylindrical opening.

d.) U.S. Pat. No. 5,501,530, to Nagai et al., discloses a double-row, angular-type ball bearing for a wheel having a groove radius relationship such that the groove radius of the outer-ring raceway on the widthwise outer side with reference to the vehicle is larger than the groove radius of the outer-ring raceway on the width-wise inner side with reference to the vehicle. Included is a shoulder section formed in the first outer-ring raceway on the outer side and the second outer-ring raceway on the inner side to have a sub-section that curves in the opposite direction with reference to the main section of the outer-ring raceway.

While the prior art present different types of caster or roller members, none offer the unique feature of an omni directional roller assembly, where the axially mounted roller member is spring biased to provide a shock absorbing quality to the assembly. The manner by which the present invention defines this unique assembly will become apparent to those skilled in the art from the following description, particularly when read in conjunction with the accompanying drawings.

SUMMARY OF THE INVENTION

This invention is directed to a dual roller assembly adapted to simultaneously rotate along perpendicular surfaces, where a preferred application may be for mobile furniture and equipment. The assembly comprises a pair of telescopically engaging shaft members sized to rotate and move axially of one another. A first shaft member mounts first and second interfitting cylindrical members receiving a rotary caster ball, where the rotary caster ball is supported for rotative movement by a first ball bearing ring. The second said shaft member mounts a cylindrical cap member for receiving a second ball bearing ring in rotary contact with the second cylindrical member. Further, the second shaft member also mounts a fixed annular ring spaced from the cylindrical cap member, and an encircling compression spring on the second shaft member extending between the cylindrical cap member and said annular ring to provide a biasing action against the cylindrical cap member.

Accordingly, an object of this invention is to provide a roller assembly that may be placed in rolling contact with two surfaces perpendicular to one another.

A further object hereof is the provision of a spring biasing member for shock absorption.

Another object of the invention is a first roller member adapted for rotative movement along a first surface, having a rotary ball within the roller member, where the rotary ball is adapted for rotative movement along a surface perpendicular to the first surface.

These and other objects will become apparent in the further description to follow.

DETAILED DESCRIPTION OF PREFERRED EMBODIMENT

Figure 1:
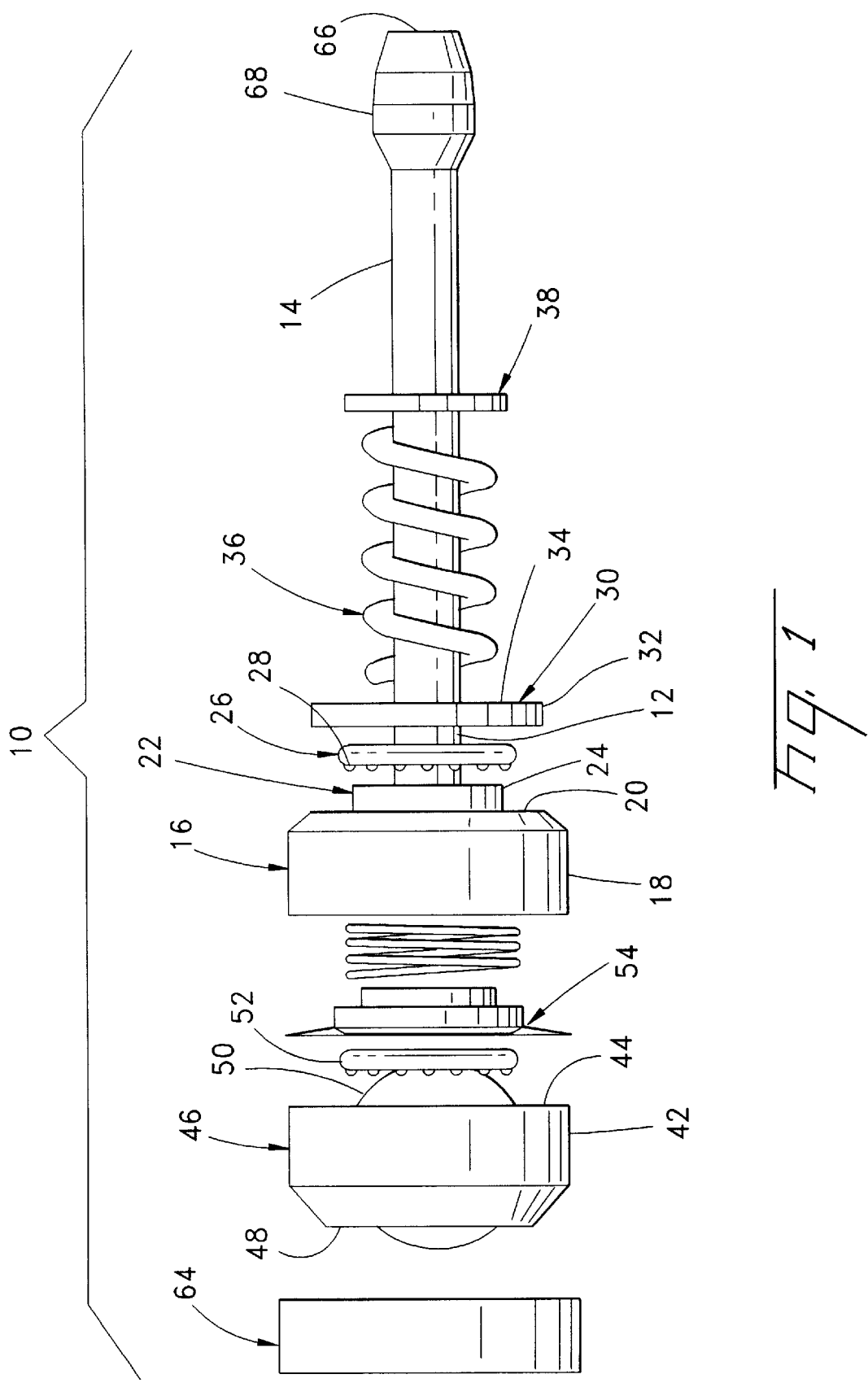
FIG. 1 is a partially exploded side view illustrating the various components forming the dual roller assembly according to this invention.

The present invention is directed to a dual rotative roller assembly that is adapted for the simultaneous rotative movement along a pair of surfaces perpendicular to one another, such as for a caster member for mobile furniture and the like. The dual roller assembly will now be described with regard to the accompanying drawings, where like reference numerals represent like components or features throughout the several views.

Figure 2:
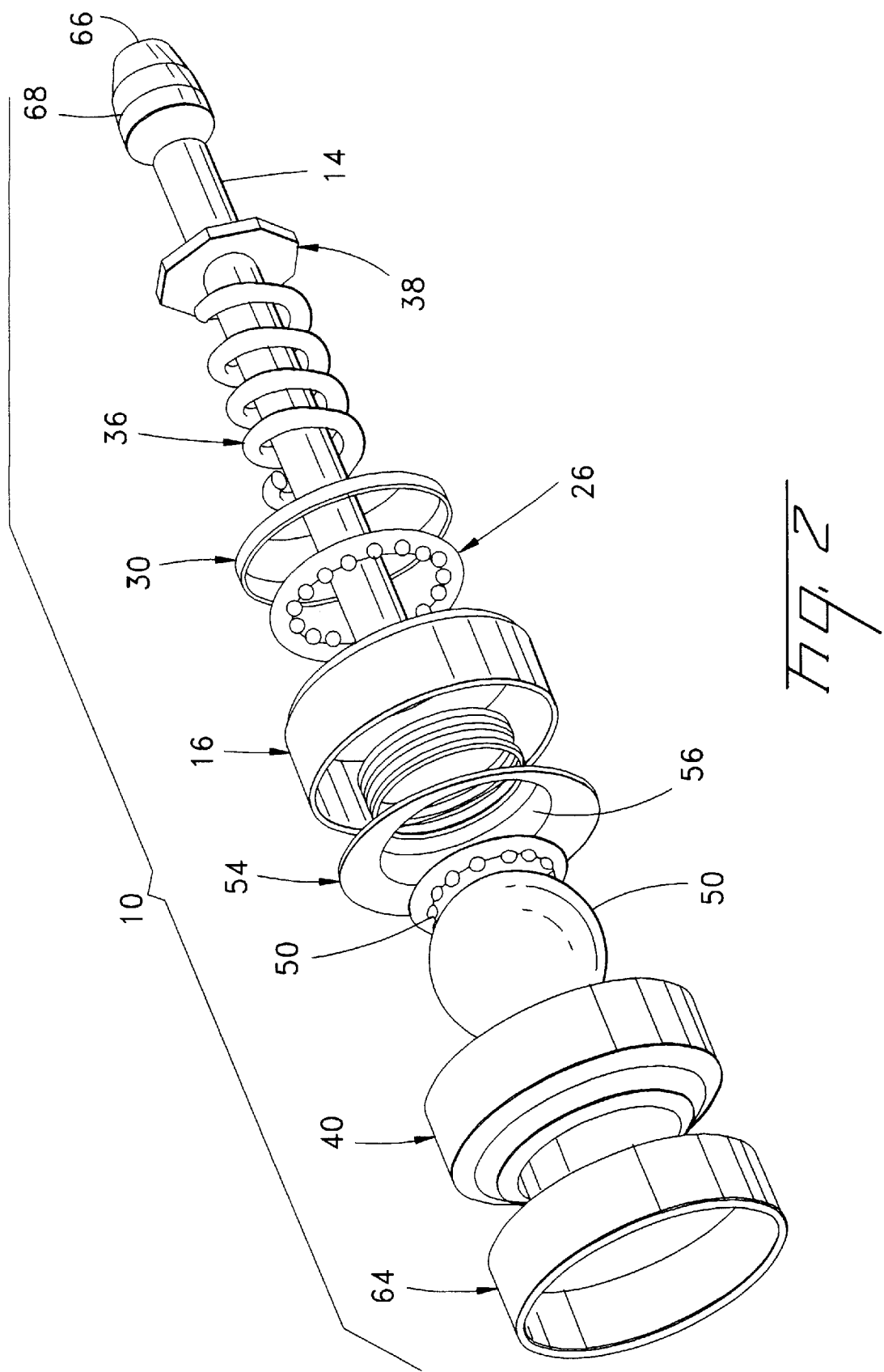
FIG. 2 is a left front, partially exploded perspective view of the dual roller assembly of FIG. 1.
Figure 3:
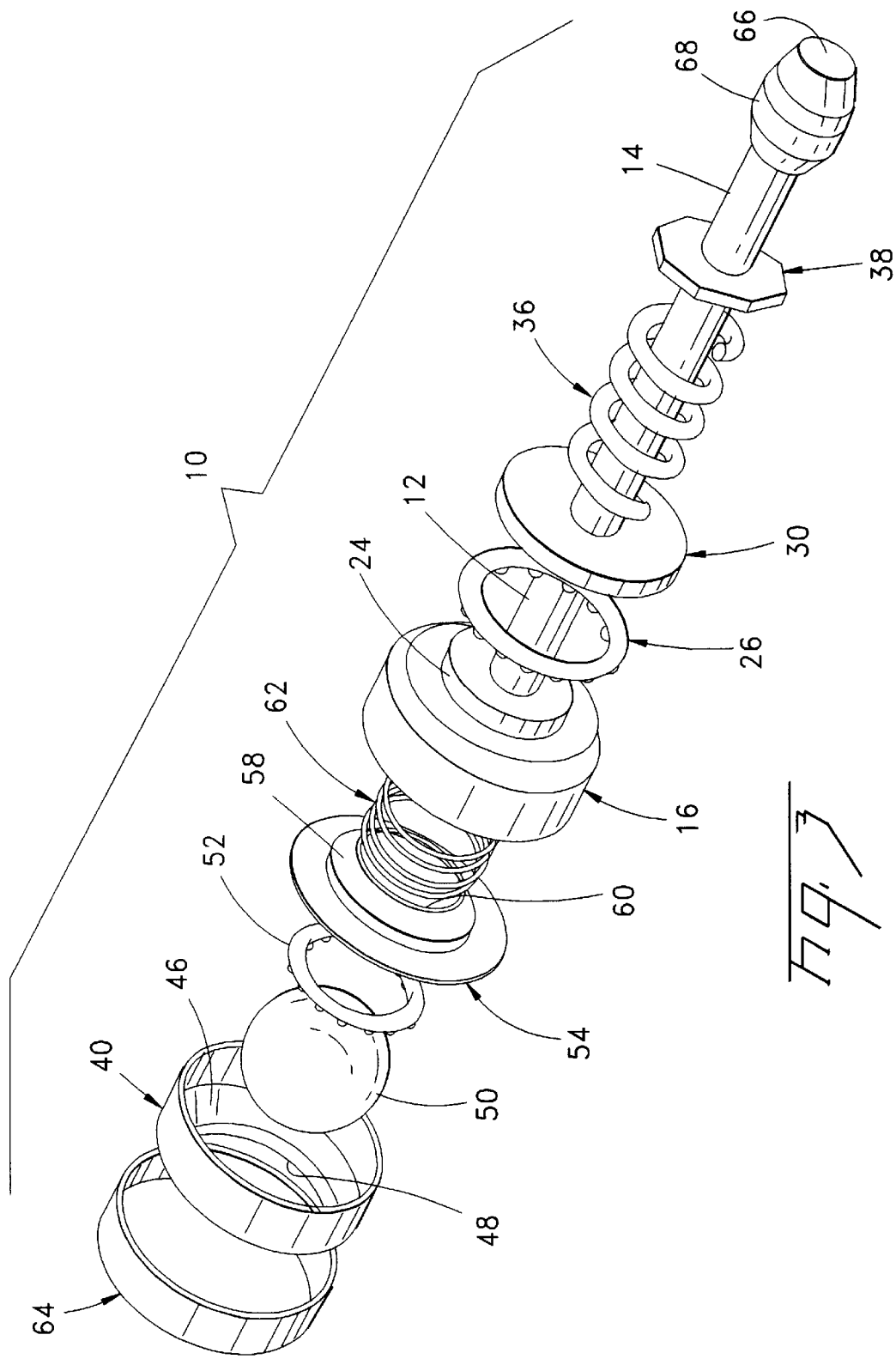
FIG. 3 is a right rear, partially exploded perspective view of the dual roller assembly of FIG. 1.

FIGS. 1–3 illustrate several orientations for the respective components forming the dual roller assembly 10 of this invention. The assembly 10 comprises a first cylindrical shaft 12 for telescopic engagement with a second cylindrical shaft 14, where the respective shafts are sized for rotative and axial movement relative to one another.

The first cylindrical shaft 12 mounts a first roller shell 16 having a circular rim 18, an end wall 20, and a raised portion 22, coextensive with end wall 20, where the raised portion 22 features an annular face portion 24. Overriding the raised portion 22 is a circular roller bearing member 26 having plural ball bearings 28 angularly disposed therefrom such that the ball bearings 28 ride along the dual surfaces of the end wall 20 and the annular face portion 24.

Further, overriding the roller bearing member 26 is a slidable circular cap 30 featuring an annular rim 32 and end face 34, where said circular cap is slidable along the second cylindrical shaft 14. Disposed adjacent to, and in biasing contact with end face 34 is a compression spring 36 surrounding the second cylindrical shaft 14. To ensure the effectiveness of the spring 36, a spring stop 38, preferably in the form of a fixed washer member, is provided along the second cylindrical shaft 14.

Returning to the roller mechanism of the assembly 10, a complementary circular shell member 40 is provided. The shell member 40 features a circular rim 42 having an open end 44, where the diameter of the open end 44 is of a size to slidably receive said first roller shell 16 to form an integral roller unit 41, see FIG. 4. The opposite end of the shell member 40 includes a tapered inner surface 46 terminating in a reduced circular opening 48, the function of which will be apparent in the further description.

Contained within the integral roller unit 41 are a rotary ball 50 and a supporting circular roller bearing member 52. To urge, the roller bearing member 52 into contact with rotary ball 50, is a circular type washer member 54, where the washer member 54 features an annular recess 56 (FIG. 2) in which the roller bearing member 52 seats. Further, the washer member 54 includes a continuous flange 58 surrounding the opening 60. The flange 58 provides an aligning and nesting surface for the compression spring 62.

As the respective components for containment in the integral roller unit 41 are brought together therewithin, the compression spring 62, urges the washer member 54 into seating engagement with the roller bearing member 52. These components in turn are urged against the rotary ball 50 which pushes such ball into and partially through the reduced circular opening 48, see FIG. 4.

For convenience as a roller gripping surface, a rubberized circular band 64 may be provided about the integral roller unit 41. Finally, as a means to facilitate use of the assembly in a mobile piece of furniture, for example, the shaft free end 66 may include an expanded end 68 for press fitting into an appropriate hole or slot in the furniture leg, as known in the art.

Figure 4:
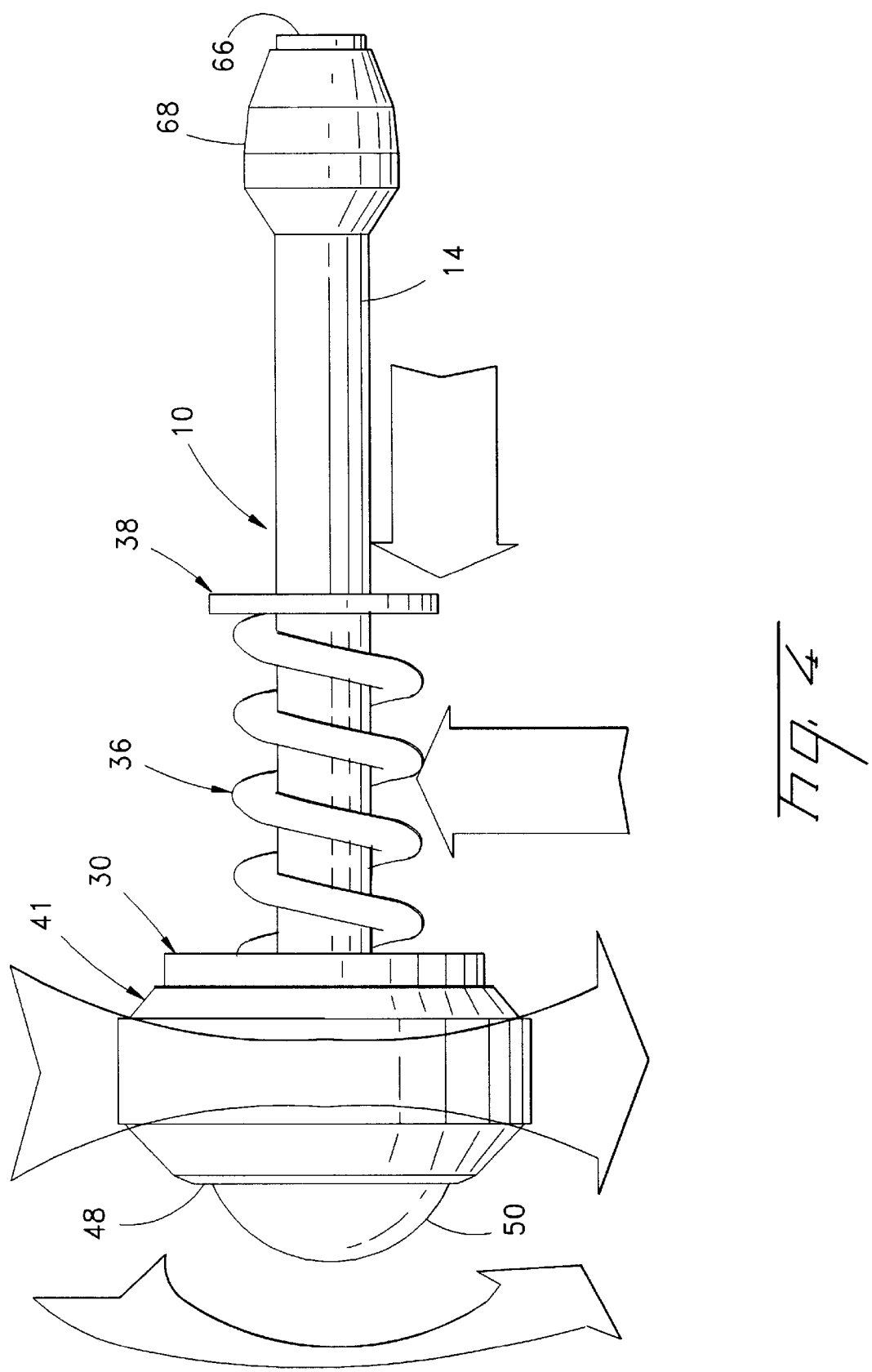
FIG. 4 is an assembled side view of the dual roller assembly of this invention, further showing the dual rolling directions.

FIG. 4 illustrates the assembled roller assembly of this invention. Such Figure shows the dual rotative directions, namely, the roller ball 50 on a first surface, and the integral roller unit 41 on a second surface perpendicular to such first surface. Also, the compression spring 36 acts to provide a shock absorbing effect to the unit, and to the mobile device upon which it is mounted.

It is recognized that variations, changes, and modifications may be made to the roller assembly of this invention without departing from the spirit and scope of the invention. Accordingly, no limitation is intended to be imposed on the invention except as set forth in the accompanying claims.

What is claimed is:

1. A dual roller assembly adapted to simultaneously rotate along perpendicular surfaces, said roller assembly comprising:

a.) a pair of telescopically engaging shaft members sized to rotate and move axially of one another;

b.) a first said shaft member mounting first and second interfitting cylindrical members receiving a rotary caster ball, where said rotary caster ball is supported for rotative movement by a first ball bearing ring;

c.) a second shaft member mounting a cylindrical cap member receiving a second ball bearing ring in rotary contact with said second cylindrical member; and d.) said second shaft member further mounting a fixed annular ring spaced from said cylindrical cap member, and an encircling compression spring on said second shaft member extending between said cylindrical cap member and said annular ring.

2. The dual roller assembly according to claim 1, wherein said first interfitting cylindrical member includes an annular rim open on the end for slidably receiving said second interfitting cylindrical member, and on the opposite end a reduced circular opening through which said rotary caster ball projects.

3. The dual roller assembly according to claim 2, including a compression spring urging said first ball bearing ring against said rotary caster ball.

4. The dual roller assembly according to claim 3, including a circular ring, sized to be slidably received in said second interfitting member, interposed between said compression spring and said first ball bearing ring.

5. The dual roller assembly according to claim 1, wherein said second interfitting cylindrical member includes an annular shoulder about which said second ball bearing ring is rotatably mounted.

6. The dual roller assembly according to claim 1, wherein said first shaft member is received in said second shaft member, and said second shaft member includes a free end having means thereon for attaching the assembly to a mobile object.

7. The dual roller assembly according to claim 1, including a circular rubberized band surrounding said first interfitting cylindrical member.

* * * * *